Sept. 25, 1962 W. W. MULTANEN 3,055,137
FISH LURE
Filed Sept. 25, 1959
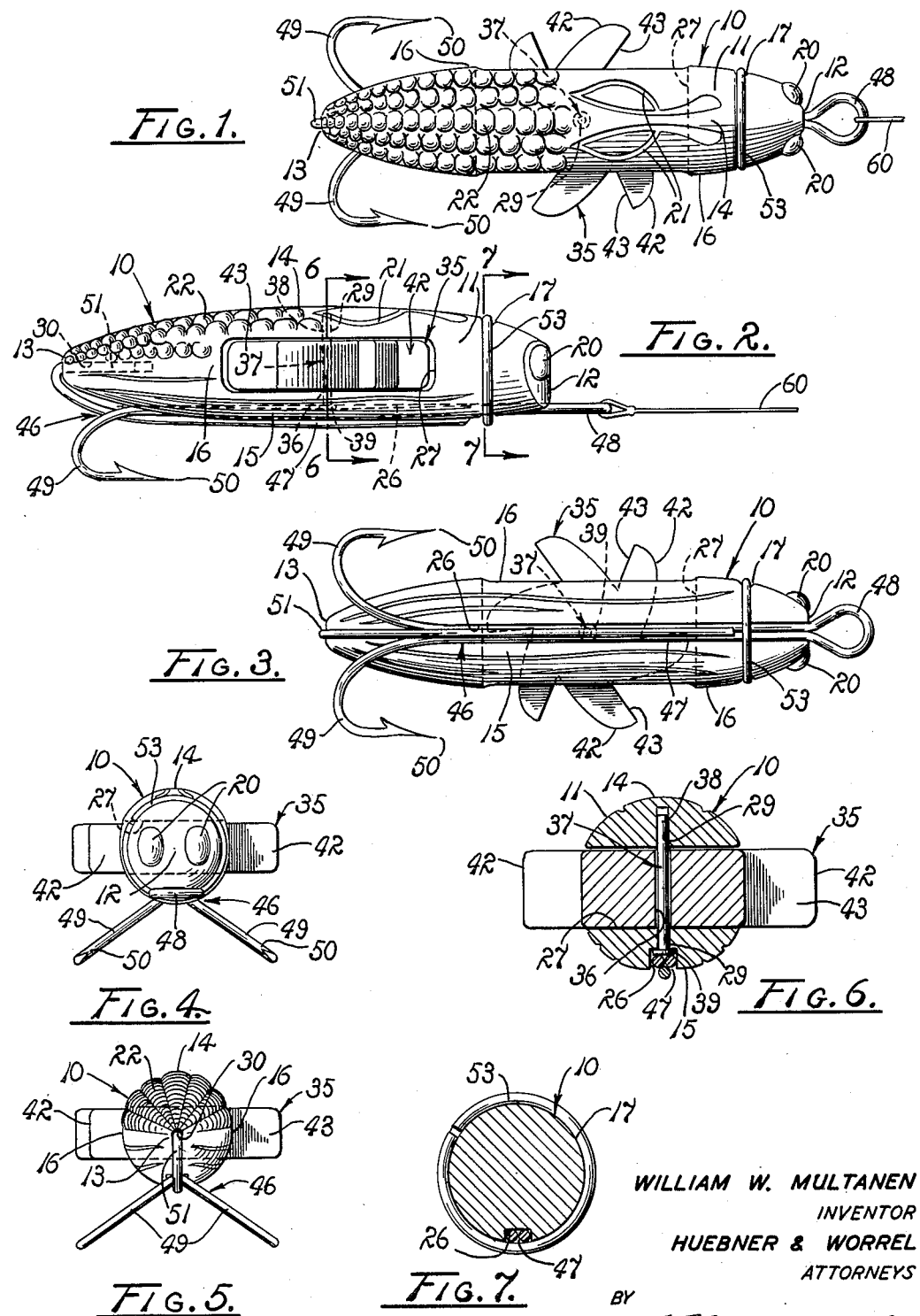
WILLIAM W. MULTANEN
INVENTOR
HUEBNER & WORREL
ATTORNEYS
BY

United States Patent Office 3,055,137
Patented Sept. 25, 1962

3,055,137
FISH LURE
William W. Multanen, 3060 Mission Drive,
Santa Cruz, Calif.
Filed Sept. 25, 1959, Ser. No. 842,336
3 Claims. (Cl. 43—42.12)

The present invention relates to a fish lure and more particularly to a lure which simulates live bait in action and which has separable parts dependably and uniquely associated in assembled relation.

In the past, fish lures simulating bugs, flies, worms, and other live bait, have been constructed by attaching feathers, thread, tinsel, and the like, to a fishhook. The resulting lures are intended to simulate natural bait in appearance as it passes through the water and in some instances simultaneously to create sounds attractive to the fish.

However, the construction of such artificial lures is frequently difficult and time consuming and requires considerable patience and skill, even if effective for catching fish. Furthermore, such lures ordinarily cannot be quickly and easily attached to a variety of fishhooks but must remain fastened on the hooks to which they are initially connected. Thus, it is frequently necessary to carry a greater supply of lures than is desired. Further, it is difficult to remove remnants of lures from their hooks when damage occurs because of use, storage or the like.

Accordingly, it is an object of the present invention to provide an improved fish lure of a type which simulates live bait in action.

Another object is to provide a lure body which is releasably connected to a fishhook.

Another object is to facilitate rapid connection and disconnection of a bait-simulating lure body and a fishhook therefor.

Another object is to provide an artificial fish lure which includes separable parts dependably and uniquely associated in assembled relation.

Another object is to enable utilization of an artificial bait simulating lure body with a plurality of fishhooks.

Another object is to facilitate the replacement of the bait simulating portion of a lure with a minimum of inconvenience and expense.

Another object is to provide a fish lure which simulates the wiggle of natural bait when passing through the water.

Another object is to provide a simple fish lure which provides fish attracting noise during passage through the water.

Another object is to provide a fish lure having a longitudinal axis and which resists rotation about said axis during use.

Another object is to provide a fish lure which resists twisting of the fish line to which it is attached while the lure is pulled through the water.

Other objects are to provide a fish lure which is simple and economical to construct and use, dependable in action, and durable in construction.

These, together with other objects, will become more fully apparent upon reference to the following description.

In the drawing:

FIG. 1 is a top plan view of a fish lure embodying the principles of the present invention.

FIG. 2 is a side elevation of the lure of the present invention.

FIG. 3 is a bottom view of the subject lure.

FIG. 4 is a front elevation of the lure of the present invention.

FIG. 5 is a rear elevation of the subject lure.

FIG. 6 is a somewhat enlarged transverse section taken on line 6—6 of FIG. 2.

FIG. 7 is a somewhat enlarged transverse section taken on line 7—7 of FIG. 2.

Referring more particularly to the drawing, a fish lure embodying the principles of the present invention is illustrated and includes an elongated, generally cigar-shaped body 10, preferably of rigid material, such as wood or plastic and being substantially symmetrical about a longitudinal axis for the body. The body has a peripheral surface 11, a forward end portion 12, a rear end portion 13, an upper portion 14, a lower portion 15, opposite sides 16, and a diametrically reduced neck 17 adjacent to the forward end portion.

Preferably, the body 10 simulates the body of an insect, bug, small fish, or other natural bait. In this regard the forward end portion 12 constitutes the head of the natural bait simulated, and thus simulated eyes 20 are provided on opposite sides of the head. Preferably, designs 21 and 22 are made on the upper portion 14 of the body in further simulation of body characteristics of such live bait. It is evident that the upper and lower portions of the body simulate the dorsal and ventral surfaces, respectively, of an insect or fish.

The lower portion 15 of the body 10 has an elongated, longitudinally extended groove 26 extended the entire length of the body and opening outwardly at the opposite forward and rearward end portions 12 and 13, respectively. The groove opens downwardly from the body and is preferably located substantially equidistantly between the opposite sides 16 of the body. The body also has an elongated, longitudinally extended, rectangular slot 27 extended transversely through the body and located generally centrally thereof intermediate the forward and rearward end portions. The body provides an elongated bore 29 extended substantially normally upwardly from the groove 26 and into the slot 27. The bore also extends upwardly from the slot in the body. It is also to be noted that the bore is located substantially centrally of the slot. Furthermore, the rear end portion 13 of the body provides a rearwardly opening socket 30 coaxially forwardly extended into the body in upwardly spaced relation to the groove.

The lure includes a substantially circular rotor 35 having a maximum diameter greater than the transverse width of the body 10 but less than the longitudinal dimension of the slot 27. The rotor has a concentric bore 36 and is positioned within the slot of the body with its bore in coaxial alignment with the bore 29 of the body. An elongated pin 37 includes a stem 38 slidably upwardly extended through the aligned bores thereby mounting the rotor for free rotation within the slot. The pin has a flat head 39 located within the groove 26 and inwardly spaced from the peripheral surface 11 of the body. The rotor has a plurality of circumferentially spaced, outwardly extended vanes 42. Further, because of the diameter of the rotor in relation to the width of the slot, rotor vanes are extended laterally outwardly on opposite sides 16 of the body in all positions of the rotor. The outwardly extended vanes simulate wings or front legs of an insect. The vanes have propelling surfaces 43 facing forwardly of the body when outwardly extended from one side thereof and facing rearwardly of the body when outwardly extended from the other side thereof, as illustrated in FIG. 1.

A two-prong fishhook 46 includes an elongated, substantially straight shank 47 releasably fitted in the groove 46 of the body 10 in overlying relation to the head 39 of the pin 37. The shank has a forward end portion extended forwardly out of the groove, and an eyelet 48 is connected to the forward end portion of the shank. The shank has a rear end portion adjacent to the rearward end portion 13 of the body. A pair of reversely turned rear hook portions 49 are integrally connected to the rearward end portion of the shank and extend rearwardly and thence forwardly with respect to the shank. More specifically, the hook portions extend downwardly and laterally outwardly in opposite directions from the shank and thus simulate rear legs of an insect. These hook portions terminate in barbed points 50 which project forwardly with respect to the body. The fishhook also provides a reversely upwardly and forwardly curved upper finger 51 extended from the rearward end portion of the shank 47 between the hook portions and releasably received in the socket 30 of the body.

A lock ring 53 is releasably fitted in circumscribing relation to the neck 17 of the body 10 and around the forward end portion of the shank 47. It is evident, therefore, that the ring serves to hold the fishhook 46 on the body and also the pin 37 in the bores 29 and 36. Since the pin is held in the body, the rotor 35 is dependably retained within the slot 27.

Operation

The operation of the described embodiment of the subject invention is believed to be readily apparent and is briefly summarized at this point.

With the fish lure assembled in the manner described above, and as illustrated, a fish line 60 is directly connected to the eyelet 48 of the fishhook 46. The lure is then cast or lowered into the water and pulled therethrough in a normal manner. Because the body 10 of the lure simulates live bait, it is physically attractive to the fish.

Of greater attraction, however, is the action of the rotor 35 in combination with the body 10. In pulling the body through the water, the rotor 35 is rotated rapidly incident to impingement of water against the forwardly directed propelling surfaces 43 of the vanes on one side 16 of the body. The spinning rotor simulates rapidly moving wings, or the rapid movements of fins or legs of live bait in trying to escape from a fish and therefore is very deceiving to the fish-to-be-caught. Also, the spinning rotor makes a slight sound when pulled through the water which is attractive to fish.

The spinning rotor 35 also causes the body 10 to wiggle laterally, that is, from side to side, as it is pulled through the water. This wiggling action is caused by an imbalance of forces on opposite sides 16 of the body as best visualized in FIG. 1. As water impinges against the rotor 35 on opposite sides of the body 10, the rearward drag is greater on one side than on the other because of rotation of the rotor. This causes the lure to curve toward the side of the greatest drag. The pull on the line 60 then tends to straighten the lure out. This imbalance results in the wiggling action described. It is of course evident that the rotor can be reversed in position so as to rotate in an opposite direction from that specifically described.

The subject lure is also advantageous in that it obviates the need for a swivel connection between the lure and the fish line 60. This is because the rotor 35 resists rotation of the body 10 about its longitudinal axis, because of the gyroscopic effect of the rotor. Since spinning of the lure about this longitudinal axis is resisted, the lure does not twist the line.

From the foregoing, it will be evident that improvements have been described in a fish lure of unique construction. The lure simulates natural or live bait because of its physical appearance, because of the action of the spinning rotor which imparts a wiggle to the lure body and simulates the moving legs of a bug or the like attempting to escape, and because the rotor creates a fish attracting sound. Also of significance is the assembly of the lure wherein essentially a single ring maintains several separable parts of the lure in assembled relation. This relationship of the parts facilitates rapid assembly and disassembly, enables attachment of the lure body, rotor, and pin to various fishhooks, and enables replacement of the lure body if the same is damaged during use.

Although the invention has been herein shown and described, in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A fish lure comprising an elongated lure body having a longitudinal axis, the body having opposite sides and front and rear end portions, the body also being provided with an elongated groove extended longitudinally of the body and opening at said opposite end portions of the body, the body further having an elongated slot extended transversely through the body in spaced relation to the groove, the body having a bore interconnecting the groove and the slot in substantially normal relation to the axis of the body, the body having a peripheral surface provided with a configuration simulating an animate bait, and the body having an endwardly opening socket at the rear end portion of the body; a pin including a stem extended through the bore and into the slot and a head in the groove against the outside of the body; a rotor located in the slot, rotatably mounted on the stem, and extended outwardly on opposite sides of the body; and a fishhook including an elongated shank fitted in the groove in overlying relation to the head of the pin, a pair of opposed return bent hook portions outwardly extended from the shank at the rear end portion of the body to simulate legs of said animate bait, a return bent finger extended from the shank into the socket, and an eyelet connected to the shank at the forward end portion of the body and a ring circumscribing the body and the shank and holding the shank in the groove and the pin in the bore.

2. A fish lure comprising an elongated body having a longitudinal axis and an exterior surface, said body having an opening centrally transversely therethrough; a pin including an elongated stem releasably slidably extended into the body across the opening in substantially normal relation to the axis of the body and having a head countersunk in the exterior surface of the body; a rotor received within said opening in the body and rotatably mounted on the stem, the rotor having water engaging portions projected from opposite sides of the body; a fishhook including an elongated shank extended longitudinally of and against the exterior surface of the body in overlying relation to the head of the pin and including a pair of hook portions outwardly extended from the shank and from the body to simulate animate appendages; and means substantially circumscribing the body and the fishhook adjacent to an end of the body releasably holding the shank of the fishhook against the body thereby to hold the pin in the body, the body having an endwardly opening socket substantially coaxial with the longitudinal axis of the body at the end of the body opposite to the circumscribing means, said fishhook having a return bent finger adjacent to the hook portion extended from the shank towards the body and into the socket.

3. In a fish lure, the combination of an elongated body having a longitudinal axis, the body being provided with an elongated slot disposed longitudinally of the body extended transversely therethrough, a bore extended inwardly from an end thereof in substantial alignment with the axis, and a longitudinal groove, the bore, axis and groove being disposed in a substantially common plane; a pin including an elongated stem releasably slidably extended into the body across the slot in substantially right angular relation to the axis and having a head countersunk in the body at the bottom of the groove; a rotor releasably rotatably mounted on the pin within the slot and having opposite peripheral portions outwardly extended from opposite sides of the body; a fishhook member having a return bent finger releasably fitted into the bore, a resiliently flexible shank received in the groove in overlying relation to the head of the pin and an eyelet endwardly extended from the body opposite to the finger; and a lock ring releasably mounted in circumscribing relation to the body and the shank adjacent to the end of the body from which the eyelet is extended holding the shank in the groove resiliently flexed against the head of the pin.

References Cited in the file of this patent
UNITED STATES PATENTS

| | | |
|---|---|---|
| 2,378,370 | Van Buren | June 12, 1945 |
| 2,574,702 | Moulton | Nov. 3, 1951 |
| 2,659,175 | Carpenter | Nov. 17, 1953 |
| 2,715,790 | Carpenter | Aug. 23, 1955 |
| 2,910,800 | Cicala | Nov. 3, 1959 |